US011278008B2

(12) United States Patent
 Vervaeke

(10) Patent No.: US 11,278,008 B2
(45) Date of Patent: Mar. 22, 2022

(54) TRANSFER MACHINE FOR LAYING EGGS ON A FLOOR OF A POULTRY HOUSE, SAID EGGS BEING LOCATED IN SETTER TRAYS IN WHICH THEY WERE SET

(71) Applicant: VERVAEKE-BELAVI, Tielt (BE)

(72) Inventor: Steven Vervaeke, Tielt (BE)

(73) Assignee: VERVAEKE-BELAVI, Tielt (BE)

( * ) Notice: Subject to any disclaimer, the term of this patent is extended or adjusted under 35 U.S.C. 154(b) by 123 days.

(21) Appl. No.: 16/625,364

(22) PCT Filed: Jun. 25, 2018

(86) PCT No.: PCT/EP2018/066962
 § 371 (c)(1),
 (2) Date: Dec. 20, 2019

(87) PCT Pub. No.: WO2019/007741
 PCT Pub. Date: Jan. 10, 2019

(65) Prior Publication Data
 US 2021/0153480 A1    May 27, 2021

(30) Foreign Application Priority Data
 Jul. 5, 2017  (BE) .................... 2017/5479

(51) Int. Cl.
 *A01K 31/18* (2006.01)
 *A01K 31/16* (2006.01)
 *A01K 43/00* (2006.01)

(52) U.S. Cl.
 CPC ............ *A01K 31/18* (2013.01); *A01K 31/165* (2013.01); *A01K 43/00* (2013.01)

(58) Field of Classification Search
 CPC .... A01K 31/165; A01K 31/16; A01K 45/007; A01K 31/18; A01K 43/00
 (Continued)

(56) References Cited

U.S. PATENT DOCUMENTS 2,903,290 A * 9/1959 Morris .................... A01K 43/00
                                                    294/65
3,013,833 A * 12/1961 Gwin ..................... A01K 43/00
                                                    294/65
(Continued)

FOREIGN PATENT DOCUMENTS

EP    1414291 B1   6/2006
EP    2377393 A1   10/2011
(Continued)

OTHER PUBLICATIONS

International Search Report dated Sep. 21, 2018, issued in corresponding International Application No. PCT/EP2018/066962, filed Jun. 25, 2018, 3 pages.
(Continued)

*Primary Examiner* — Brady W Frazier
*Assistant Examiner* — Zoe Tam Tran
(74) *Attorney, Agent, or Firm* — Christensen O'Connor Johnson Kindness PLLC

(57) ABSTRACT

A transfer machine, the setter trays being placed with set eggs on a carrying mechanism. The carrying mechanism positions the setter trays under a transfer mechanism that includes a series of egg pick-ups. By moving the transfer mechanism down towards the eggs, the egg pick-ups can pick up the eggs and lift them out of the setter trays.

18 Claims, 4 Drawing Sheets

(58) Field of Classification Search
USPC .......................................................... 119/440
See application file for complete search history.

(56) References Cited

U.S. PATENT DOCUMENTS

| | | | | |
|---|---|---|---|---|
| 3,077,993 | A * | 2/1963 | Mulvany | B65B 23/08 414/627 |
| 3,230,001 | A * | 1/1966 | Hirt | B65B 23/08 294/184 |
| 3,929,234 | A * | 12/1975 | Warren | B65B 23/08 414/737 |
| 3,934,916 | A * | 1/1976 | Baker | A21B 3/18 294/189 |
| 4,344,730 | A * | 8/1982 | Dvorak | A01K 43/00 414/405 |
| 4,411,574 | A * | 10/1983 | Riley | B65B 21/20 198/432 |
| 4,787,812 | A * | 11/1988 | Gopfert | B66C 1/0212 414/737 |
| 11,021,283 | B2 * | 6/2021 | Vervaeke | A01K 31/19 |
| 2005/0095106 | A1 * | 5/2005 | Pearce | B66F 9/181 414/627 |
| 2007/0189888 | A1 * | 8/2007 | Tanner | B66F 9/02 414/672 |
| 2009/0314691 | A1 * | 12/2009 | Hebrank | A01K 43/00 209/511 |
| 2011/0264306 | A1 * | 10/2011 | Bagge | B66F 9/182 701/2 |
| 2012/0255498 | A1 | 10/2012 | Pitzer | |
| 2015/0071741 | A1 * | 3/2015 | Schnupper | A23L 15/00 414/225.01 |
| 2015/0096497 | A1 * | 4/2015 | Schnupper | F04B 13/00 119/6.8 |
| 2016/0227744 | A1 * | 8/2016 | Rees | A01K 43/00 |

FOREIGN PATENT DOCUMENTS

| | | | |
|---|---|---|---|
| EP | 2873319 A1 | 5/2015 | |
| WO | WO-0054579 A1 * | 9/2000 | ........... A01K 45/007 |

OTHER PUBLICATIONS

Written Opinion of the International Searching Authority dated Sep. 21, 2018, issued in corresponding International Application No. PCT/EP2018/066962, filed Jun. 25, 2018, 6 pages.

* cited by examiner

TRANSFER MACHINE FOR LAYING EGGS ON A FLOOR OF A POULTRY HOUSE, SAID EGGS BEING LOCATED IN SETTER TRAYS IN WHICH THEY WERE SET

The present invention relates to a transfer machine for laying eggs on a floor in a poultry house, said eggs being located in setter trays in which they were set. The set eggs in the setter trays are first transferred to the poultry house. The set eggs are then transferred from the setter trays to the floor of the poultry house. The chicks then hatch in the broiler house, which promotes the welfare of the birds. After all, the chicks no longer have to be transported and also immediately have feed and water at their disposal.

In practice, the problem arose that the set eggs do not hatch simultaneously. For example, in the case of chickens, there are eggs that already hatch after 19 days, while some eggs only hatch after 21 days. If you let the eggs hatch in a hatchery and transport the day-old chicks to the broiler house, this means that some of the chicks will be without feed or drink for 2 to 3 days. During the transport of the chicks and the preparation thereof, the chicks are also packed closely together. This not only has adverse effects on bird welfare but also on the growth and development of the chicks and on their susceptibility to disease.

To avoid this, new systems were developed in which set eggs—which, in particular, were incubated for 18 days— were brought to the broiler house, where the eggs could then hatch. In the so-called 'X-Treck system', the set eggs, together with the setter trays in which they are located, are placed on a transport system suspended in the poultry house. The temperature of the eggs in the setter trays can then be controlled by raising the transport system in the poultry house up to a height where it is warmer or lowering it to a height where it is colder. Especially nearing the hatching of the eggs, the temperature thereof increases because the activity of the chick in the egg increases. The transport system is then located at a limited height above the floor of the poultry house so that the chicks can jump off the transport system and onto the broiler house floor.

With the so-called 'Patio system', several transport systems for the setter trays are provided above each other, each with a conveyor belt under it covered with litter on which the chicks can live until they are ready for slaughter. The aeration of the various levels is done by a horizontal air flow as described in NL 1012453. The advantage of this Patio system is that less space is required in the poultry house, but the system is of course more expensive than the X-Treck system.

EP 2 873 319 relates to the X-Treck system, in which the setter trays containing the set eggs are placed on a raising system in the broiler house. According to this patent application, the raising system is required to allow the temperature of the eggs to be controlled since eggs placed on the broiler house floor have a lower hatching rate.

In view of the cost, the complexity of the maintenance, and the additional work involved in cleaning the system, these known systems are only applied on a limited scale in practice. Because the day-old chicks hatch in the setter trays and continue to walk on them for some time, the setter trays are fouled by the manure of the newly hatched chicks. As a result, there is a real risk of infection of the setter trays with germs, especially with harmful bacteria such as *Salmonella*. Due to the risk of contamination, as well as the cost of both systems, poultry farmers are not inclined to place such a system in their poultry houses. Due to the complex design of the setter trays with a high degree of openness that is needed for controlling the temperature of the eggs during setting, the setter trays are also difficult to clean. In particular, the setter trays have many corners and edges where infections or manure—which can be infected with, for example, *Salmonella*—is not easy to remove. A further disadvantage of allowing the chicks to hatch in the setter tray itself is that due to its large degree of openness, there is a problem with the welfare of the birds. Indeed, the newly hatched chicks can hurt themselves on the many corners and edges that are present in the setter trays to hold the eggs while maintaining a high degree of openness for the required air flow. As a result, the chicks can even get stuck in the setter trays.

In EP 1 414 291, another system for letting eggs hatch in a poultry house is described. As shown schematically in this patent, the set eggs are not allowed to hatch in the setter trays but are laid on a sheet of paper on a layer of litter. Feed and water are also provided for the newly hatched chicks on this sheet of paper. To keep the temperature of the eggs under control, they are placed in a closed cart or a cover is laid over them when placed on the broiler house floor itself.

Although the possibility is indicated in EP 1 414 291 of placing the set eggs on a sheet of paper on top of the litter layer, this was never practised, in particular, neither in the Patio system, nor in the X-Treck system. In a broiler house, several thousand or even tens of thousands, for example 40,000, set eggs must be put in place, and efficiently, such that little time is needed to put the set eggs in place. In view of the cost of manual labour, if the eggs were to be laid down loose in the broiler house, this would need to be done quickly, which is not only very taxing, among other things, due to the high temperature in the broiler house, but would also result in a high risk of damaging the eggs. Towards hatching time, the eggshells become much more brittle, so the eggs must be handled softly, in particular, to prevent the formation of hairline cracks in the eggshells. In the case of hairline cracks, the chicks in the eggs will dry out faster, causing them to weaken and become more susceptible to infections. As a result, fewer eggs will hatch, generally substantially 15% less if the eggs have hairline cracks, and more antibiotic treatments will be needed to fight bacterial infections. Such antibiotic treatments have been under pressure in recent years and should therefore be avoided as much as possible.

To prevent the transmission of contamination via the setter trays, WO 2016/053088 proposes transferring the set eggs from the setter trays to a cardboard container before the eggs are transported to the broiler house. The set eggs are thus transported from the hatchery to the broiler house in these cardboard containers. This system is used in practice under the name 'One2Born'. The cardboard containers consist of egg cartons containing additional holes for the aeration of the eggs and for controlling their temperature. The containers stand on cardboard legs so that the eggs are not directly on the floor of the poultry house.

Despite the fact that the cardboard containers are biodegradable, they create extra waste in the poultry house that has to be removed. A further disadvantage of the cardboard containers is that they are delivered in folded form and that a considerable amount of manual labour is required to set up the containers. Not only purchasing the cardboard containers, but also setting them up, thus involves additional costs. In the hatchery itself, the eggs also still need to be transferred into the cardboard containers. It has been found in practice that such a transfer step each time causes an additional average loss of approximately 0.5%, especially if the eggs are to be positioned in the cavities provided for this purpose in the egg cartons. Indeed, the eggs will not always be positioned completely correctly in relation to these cavities, so that they will make contact with the walls of the cavities when placing them in the cavities. Due to the fragility of the eggshells, this will cause a considerable amount of hairline cracks in the eggshells.

In BE 1023719, a transfer machine is described according to the preamble of claim 1 which solves the problems of the systems described above. In particular, the transfer machine comprises a frame that can be rolled through the poultry house; a carrying mechanism mounted on the frame and configured to carry at least one of said setter trays with set eggs; and a transfer mechanism attached to the frame having a series of egg pickup means each configured for gripping one of the set eggs, the transfer mechanism being configured for lifting the set eggs out of said setter trays and for placing the set eggs on said floor.

The use of such a transfer machine makes it possible to lay a large number set eggs, for example thousands to tens of thousands of eggs per hour, directly from their setter tray in an insulating litter layer in the poultry house. In addition, the setter trays can thus not be fouled by the manure produced by the day-old chicks. Because in practice the poultry house is disinfected before each new load of chicks, and is provided with a new litter layer, there is also no risk that the setter trays will become infected. Physical contact between the setter trays and the materials in the poultry house can also be easily avoided. Moreover, disinfection of the setter trays is very simple as the setter trays themselves are not fouled.

Furthermore, BE 1023719 describes that, contrary to what is indicated in EP 2 873 319, the hatching rate of the eggs in the poultry house is not lower than the hatching rate of the same eggs in the hatchery when the set eggs are laid on the floor of the poultry house.

The transfer machine in BE 1023719 is equipped with a conveyor belt on which the setter trays are placed and a swivelling robotic arm with a series of egg pickup means on it, in particular a series of suction cups. The robotic arm is configured to lower the egg pickup means to near the setter tray on the conveyor belt, after which the egg pickup means can grasp the eggs. The robotic arm then lifts the eggs and pivots them to above the layer of litter, after which the robotic arm lowers the eggs to near the layer of litter. Then the egg pickup means are switched off and the eggs end up on the layer of litter in the poultry house.

A drawback of the known machine is that, in order to have a sufficient capacity, i.e. to be able to place sufficient eggs per hour in the poultry house, the movement of the robotic arm, in particular the swivel movement of the robotic arm, has to have a relatively high speed. However, such a relatively high speed involves a high risk of damaging the eggs. After all, as described above, towards hatching time, the eggshells become much more brittle, so the eggs must be handled softly, in particular, to prevent the formation of hairline cracks in the eggshells. In addition, the risk of damage during the pivotal movement of the robotic arm is all the greater since the eggs at that moment are hanging on the suction cups and can thus collide with each other. All this ensures that, with the known transfer machine, the maximum capacity is limited by the maximum safe speed of the pivotal movement of the robotic arm.

In addition, due to the length of the robotic arm, a rocking movement of the machine can occur during pivoting of the robotic arm. Such a rocking motion of the machine is detrimental to the eggs, since they may possibly be damaged as a result. This effect is all the greater as the distal part of the robotic arm has a greater weight and is further strengthened if the machine is fitted with wheels with pneumatic tyres.

A further drawback of the known machine is that the robotic arm has to process a relatively large force, in particular moment of force, because the setter trays are situated, at least temporarily, alongside the robotic arm. The robotic arm must therefore be sufficiently strong to support the weight of the filled setter trays with due regard to the lever effect due to the distance between the setter trays and the support point of the robotic arm. Such a robotic arm increases both the weight of the robotic arm, i.e. the machine, and the price to manufacture the machine.

The object of the invention is therefore to provide an improved transfer machine for laying eggs in a poultry house on a floor thereof which are set in setter trays, wherein the maximum capacity is increased without increasing the risk of additional loss of eggs. To this end, the transfer machine according to the invention is characterised in that the transfer mechanism is movably mounted on the frame up and down in a predetermined path between an upper position and a lower position and that the support mechanism is movably mounted on the frame between an outer position, in which the carrying mechanism is outside the path of the transfer mechanism, and an inner position, in which the carrying mechanism is located in the path of the transfer mechanism, the transfer machine further comprising: a first actuator configured for moving the transfer mechanism up and down; a second actuator configured for moving the carrying mechanism back and forth; a third actuator configured for actuating the egg pickup means; and a control mechanism configured to perform the following steps: a) controlling said second actuator for moving the carrying mechanism from its outer position to its inner position; b) controlling said first actuator for moving the transfer mechanism down to the set eggs located in said setter trays on the carrying mechanism; c) controlling said third actuator for gripping the set eggs with the egg pickup means; d) controlling said second actuator for moving the carrying mechanism from its inner position to its outer position; e) controlling said first actuator for moving the transfer mechanism downwards, towards the floor, along the path; f) controlling said third actuator for releasing the set eggs from the egg pickup means to place them on the floor; and g) controlling said first actuator for moving the transfer mechanism up to its upper position.

By placing the carrying mechanism in and out of the path of the transfer mechanism, a transfer mechanism can be provided, where the eggs only have to undergo an upward and downward movement when they have been gripped by the egg pickup means. Such vertical movements have a lower risk of damaging the eggs, both because a vertical movement is less harmful compared to a horizontal movement and in particular because there is no risk that the eggs can come into contact with each other in a lateral direction. In addition, the eggs are still in the setter tray during the moving back and forth of the carrying mechanism. Because of the extra protection provided by the setter tray, this moving back and forth can thus be done faster than the pivotal movement in the already known transfer machine. Hence, the combined movement of the back and forth movement of the carrying mechanism and the up and down movement of the transfer mechanism is faster than the movement of the known robotic arm, resulting in a higher maximum capacity, without increasing the risk of additional loss of eggs.

In an embodiment of the invention, the transfer mechanism comprises at least two carrying elements which can be moved towards and away from each other and a fourth actuator, configured for moving said at least two carrying elements towards and away from each other, where a number of the series of egg pickup means are applied on each of the carrying elements, and the control mechanism is further configured for: controlling, after step d) and before step f), said fourth actuator for moving said carrying elements away from each other; and, after step f), controlling said fourth actuator for moving said carrying elements towards each other.

In this embodiment, it is possible to vary the distance between the eggs. This is advantageous because it was determined that the distance between the eggs has an important effect on the temperature thereof. For example, the outer row of eggs of a strip of eggs will have a lower temperature than the eggs located in the middle of the strip. By placing the eggs at a somewhat larger distance from each other the temperature of the eggs can be prevented from getting too high towards hatching time.

Preferably said fourth actuator comprises a pneumatic piston mechanism, wherein at least one adjustable limiter is provided between said carrying elements for controlling and limiting a maximum distance between said carrying elements. The adjustable limiter allows the distance between the eggs to be adjusted, so that the size of the eggs can also be taken into account. Thus, for example with larger eggs, a greater distance can be provided between the eggs.

In an embodiment of the invention, the predetermined path of the transfer mechanism defines a predetermined path of each of the egg pickup means of the series of egg pickup means, wherein the carrying mechanism comprises positioning means configured to position the setter tray so that each of the set eggs is on the predetermined path of one of the egg pickup means, the carrying mechanism comprising a fifth actuator configured for driving the positioning means and wherein the control mechanism is further configured to control, before step b), said fifth actuator for positioning the setter tray in the path of the carrying mechanism so that each of the set eggs is on the predetermined path of one of the egg pickup means.

In this embodiment, the setter trays are automatically positioned correctly by the positioning means so that each of the paths of the egg pickup means intersects with the location of an egg. This automation yields an additional time gain during the laying of the eggs.

Preferably, the positioning means comprise a transport mechanism configured for moving the setter tray in a substantially horizontal direction.

Preferably, the carrying mechanism is mounted in a back and forth movable manner on the frame in a substantially horizontal direction.

The horizontal directions limit the travel distance, and thus the travel time, of both the transport mechanism and the carrying mechanism.

In addition, it is particularly advantageous that the direction of movement of the positioning means is substantially perpendicular to the back and forth direction of movement of the carrying mechanism. This allows the carrying mechanism to be placed in front of or behind the transfer mechanism, where the carrying mechanism can be loaded laterally.

In an embodiment of the invention, said setter trays have a substantially rectangular shape, wherein the carrying mechanism is provided for carrying at least two setter trays which are placed with their short sides almost against each other.

In the known transfer machine, as described in BE 1023719, the setter trays are placed with their long sides against each other in order to avoid the larger forces, in particular moments of force, associated with placing the setter trays against each other along their short sides. However, it is preferable to place the setter trays with their short sides against each other because this limits the total travel distance of the transfer machine.

In an embodiment of the invention, each egg pickup means comprises a suction cup which is configured for, during step b), making contact with one of the set eggs, said third actuator, preferably a vacuum pump, being configured for sucking the air out of the suction cups for gripping the set eggs by suction.

Suction cups are preferred over mechanical grippers because they involve the smallest risk of damaging the eggs.

Preferably said suction cups are resilient, preferably bellows-shaped, so that, during step f), by a force generated by the resilient suction cups, each of the set eggs penetrates to a certain depth into a layer of covering material, preferably insulating covering material which, more preferably, contains litter, on the floor of the poultry house.

Preferably, said third actuator is further configured to pump, during step f), air into each suction cup so that each of the set eggs penetrates to a certain depth into a layer of covering material, preferably insulating covering material that, more preferably, contains litter, on the floor of the poultry house.

Due to the resilient action and/or pumping of air, the eggs are pushed to a certain depth into the layer of covering material. This allows the insulation of the eggs to be controlled. The deeper the eggs are placed in the covering material, the more they will be insulated from the ambient air.

In an embodiment of the invention, one or more, preferably each, of the actuators are pneumatically driven. This avoids the use of a hydraulic fluid which, in the event of leaks, could contaminate the poultry house.

In an embodiment of the invention, the number egg pickup means from said series corresponds to the number of eggs in one or in several of the setter trays, in particular in one or in two of the setter trays, the transfer mechanism being configured to simultaneously lift each of the set eggs from each of the setter trays.

The simultaneous lifting of the eggs results in an additional time gain during egg laying.

In an embodiment of the invention, said series of egg pickup means contains at least 30, preferably at least 50, more preferably at least 100 and in particular 300 egg pickup means.

By providing a larger number of egg pickup means on the transfer machine, the capacity thereof can be increased such that the required number of eggs can be placed in a broiler house in a short time.

In an embodiment of the invention, the transfer machine is provided with a motor configured for moving the frame through the poultry house. As a result, the operation of the transfer machine can be further automated, for instance by allowing it to move independently, which yields an additional time-saving during the laying of the eggs and also makes it unnecessary for a person to wheel the transfer machine.

In an embodiment of the invention, the control mechanism is further configured to control, after step c) and before step d), said first actuator for upwardly moving the transfer mechanism to lift the set eggs gripped by the egg pickup means out of said setter trays.

In this embodiment, the eggs are also lifted, after being gripped. As a result, there is no risk that the empty setter trays on the carrying mechanism could touch the gripped eggs while the carrying mechanism is sliding away from underneath the transfer mechanism, possibly damaging the eggs.

Further advantages and particulars of the invention will become apparent from the following description of a preferred embodiment of the transfer machine according to the invention. However, this description is only given as an example and is not intended to limit the scope of protection as defined by the claims.

The reference signs given in the description relate to the appended drawings wherein:

FIG. 1 schematically represents a perspective view of a transfer machine according to the invention for transferring set eggs from the setter trays to an applied strip of litter in a poultry house;

Figure 1:
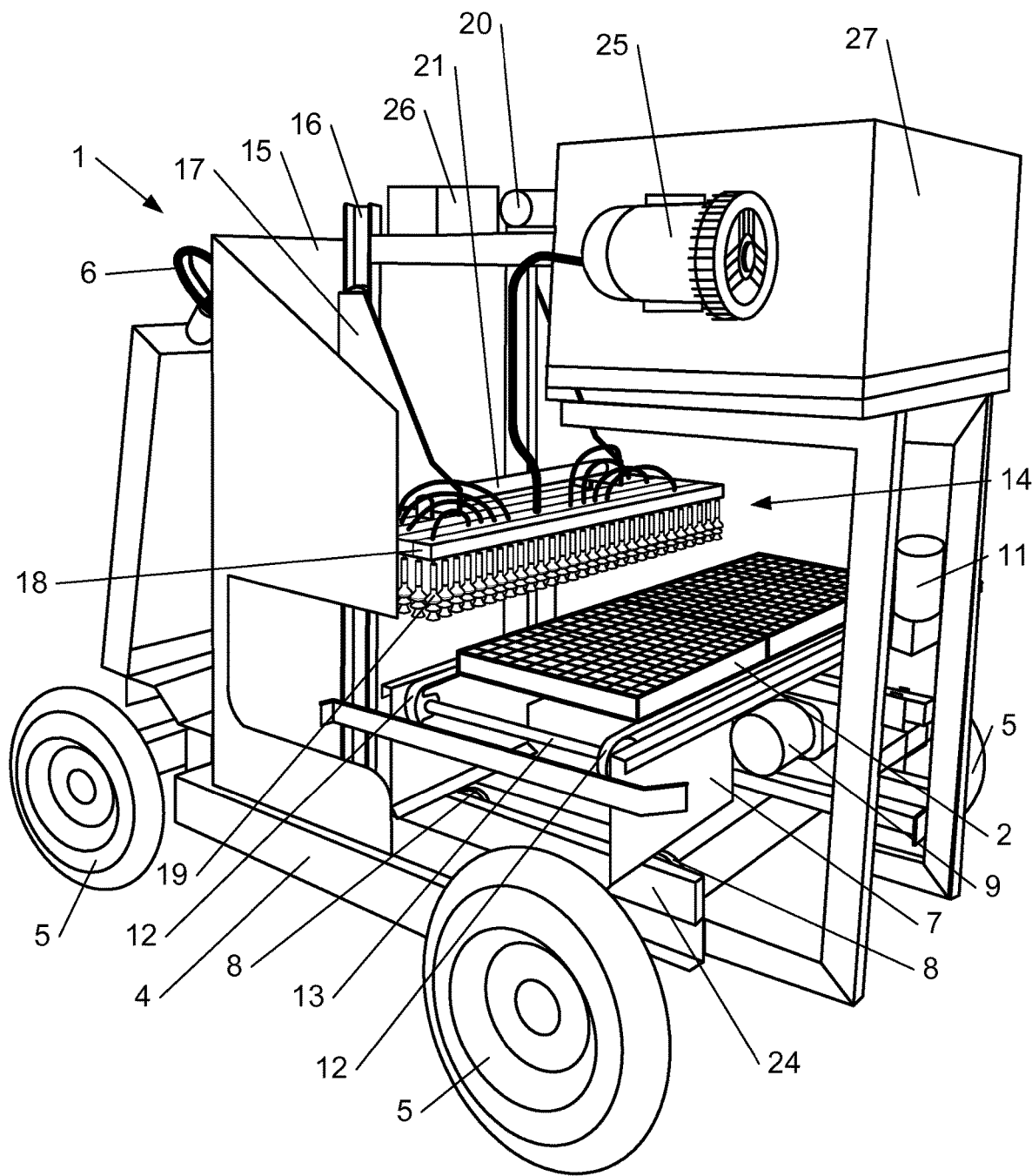

In general, the invention relates to a transfer machine 1 for transferring to a floor of a broiler house eggs which have been set in setter trays 2. For chicken eggs, this happens after the eggs have been set for about 18 days. As the first eggs will hatch only after 19 days, there is no risk that the eggs will already hatch during the transport or during the transferring in the poultry house. The transfer machine 1 according to the invention can also be applied to other eggs, for example eggs of turkeys, pheasants and the like.

In practice, there are various kinds of setter trays 2 for setting chicken eggs. An example of this is the standard setter tray 'Tray B00568' of the Petersime company. This setter tray is provided for 10 rows of 15 eggs, that is, for a total of 150 eggs.

For transporting the eggs to the broiler house, the setter trays 2 are placed in mobile carts, which are then transported with a truck. The advantage of transporting the eggs by means of the setter trays 2 is that no transfer step is required, which always causes a certain amount of damage to the eggs.

In the broiler house, a layer of insulating covering material 3 (illustrated in FIGS. 3C, 3D and 4) is preferably provided on which the set eggs from the setter trays 2 are positioned by means of the transfer machine 1. The insulating covering material 3 is applied in particular in one or more strips to the broiler house floor. The insulating covering material 3 can be formed by a mat, for example, a mat made of plastic foam, but preferably litter is used for this purpose, such as, for example, flax straw, sawdust, wood shavings and the like.

If the eggs are positioned in one or more strips on the covering material, it is preferable to provide the eggs along the sides of these strips with extra insulation by providing more covering material along those sides. In the case of litter, this can be swept together along the sides so as to obtain an increase in height. This can possibly be done after the eggs have been transferred, such that the litter can be swept up to the outer row of eggs.

The litter that is placed under the eggs can, but does not have to be, the same as the litter with which the remaining part of the floor of the poultry house is covered. Preferably, the entire floor of the poultry house is first covered with a thin layer of litter, after which an additional layer of litter (the same or different) or covering material is applied on top of that at the locations where the eggs will be positioned.

To keep the eggs sufficiently warm, the layer of covering material 3 applied to the floor of the poultry house under the eggs should preferably have an average thickness of at least 2 cm, more preferably of at least 3 cm, and most preferably of at least 4 cm. After transferring the eggs to this covering material 3, additional insulation may be provided, for example, by covering the eggs with a sheet, such as a sheet of paper or a plastic film. It is also possible, for example, to sprinkle extra litter on the eggs. However, the use of a sheet has the advantage that it can be taken away again when the eggs are about to hatch so as to avoid increasing the temperature of the eggs too much towards hatching time.

To control the temperature of the eggs, it is preferable to monitor a number of the eggs. The temperature in the poultry house can then be adjusted to the temperature of the eggs. Measuring the eggshell temperature can be done manually by means of, for example, an infrared thermometer, but there are also automatic systems for monitoring the temperature of the eggshells, such as the OvoScan™ system. This is currently being used for monitoring and controlling the temperature in hatchers in hatcheries and would therefore only need to be adapted to the climate control system of a broiler house.

FIG. 1 schematically shows an embodiment of the transfer machine 1 used for transferring the eggs. This transfer machine 1 is a self-driving machine, provided with a frame 4 on which wheels 5 are mounted. The transfer machine 1 is provided to advance in the broiler house during the transfer of the eggs. To this end the transfer machine 1 is provided with a motor (not shown), preferably an electric motor, for driving at least one of the wheel axles. The transfer machine 1 is also provided with a steering device 6 which allows the direction of travel to be adjusted.

In a non-shown embodiment, the transfer machine 1 is also used to place the strip or strips of covering material 3 on which the eggs will be laid in the poultry house. This ensures that the poultry house does not have to be provided with the covering 3 in advance. To this end, an apparatus (not shown) is connected to the transfer device 1 for the application of the covering material 3.

If the covering material 3 is a roll of foam, this can simply be a holder, with which this roll is unrolled onto the floor of the poultry house. If the covering material 3 includes litter, the apparatus is a spreader with which the litter is sprinkled in the desired thickness onto the floor of the poultry house. This is done, for example, by means of a rotor driven by the wheels of the spreader. Preferably the spreader will have a control with which the amount of litter sprinkled on the floor of the poultry house can be controlled. For example, this control could include a controllable coupling between the wheels of the spreader and the rotor with which the relationship between the number of revolutions of the wheels and the number of revolutions of the rotor can be adjusted.

On top of the transfer machine 1, a carrying mechanism 7 is provided which is slidably mounted on the frame 4 with the aid of a number of wheels 8 which run in a rail. In this way the entire carrying mechanism 7 can be moved back and forth on the frame 4. An actuator 9 is also provided on the transfer machine 1 for the carrying mechanism 7, so that the entire carrying mechanism 7 can be shifted. Preferably, a sensor (not shown) is provided for determining the edge of the carrying mechanism 7. This sensor information is then used to the actuator 9 until the edge of the carrying mechanism 7 is at a preset position, said position, as described below, is determined on the basis of the position of the egg pickup means.

The carrying mechanism 7 is provided with a transport mechanism on which the operator of the machine 1 must place the one or more setter trays 2. The transport mechanism is driven by an actuator 11, preferably an electric motor. With this transport mechanism, the setter trays 2 are positioned in the correct position on the machine 1. In particular, a sensor (not shown) is provided which detects the position of the edge of the setter tray 2. This sensor information is then used to drive the actuator 11 until the edge of the setter tray 2 is at a preset position, said position, as described below, is determined on the basis of the position of the egg pickup means.

As shown in FIG. 1, the transport mechanism is formed by two opposite belts 12 on which opposite sides of the setter trays 2 are supported. The belts 12 rotate around a wheel axle 13 driven by the actuator 11. Preferably, the actuator 11 can be operated in two different directions, thereby pushing the empty setter trays 2 back to the operator of the machine 1.

It is clear that the two opposite belts 12 can also be replaced by other transport mechanisms, such as a conveyor belt or a roller system.

On the frame 4, a transfer mechanism 14 has also provided, which is movably mounted up and down on the frame 4. Specifically, as shown in FIG. 1, an upright wall 15 is provided with two rails 16 thereon in which one support element 17 is slidably mounted in each case. Near the ends of the support elements 17, a housing 18 is attached, in particular via a cross beam 21, on which there are egg pickup means 19. An actuator 20 is also provided on the wall 15 for moving the housing 18 up and down, and thus also the egg pickup means 19. With these egg pickup means 19, the eggs are lifted from the setter trays 1 and then positioned on the covering material 3 by moving the entire housing 18 up and down.

For the gripping of the eggs, an actuator in the form of a vacuum pump 25 is provided to suck the air out of the egg pickup means 19 when these are positioned against eggs, as described in more detail below as per FIGS. 3a to 3d. If the egg pickup means 19 are provided for gripping the eggs by mechanical means, the vacuum pump 25 can be replaced by another type of actuator, for example an electric motor, for driving the mechanical means.

In an alternative embodiment, the carrying mechanism 7 can be placed laterally next to the transfer mechanism 14. However, it is preferable to place carrying mechanism 7 in the direction of travel behind the transfer mechanism 14 as illustrated in FIG. 1. This namely constitutes a more stable version compared to a laterally attached carrying mechanism 7. It is also possible to place the carrying mechanism 7 in the direction of travel in front of the transfer mechanism 14.

Figure 2A:
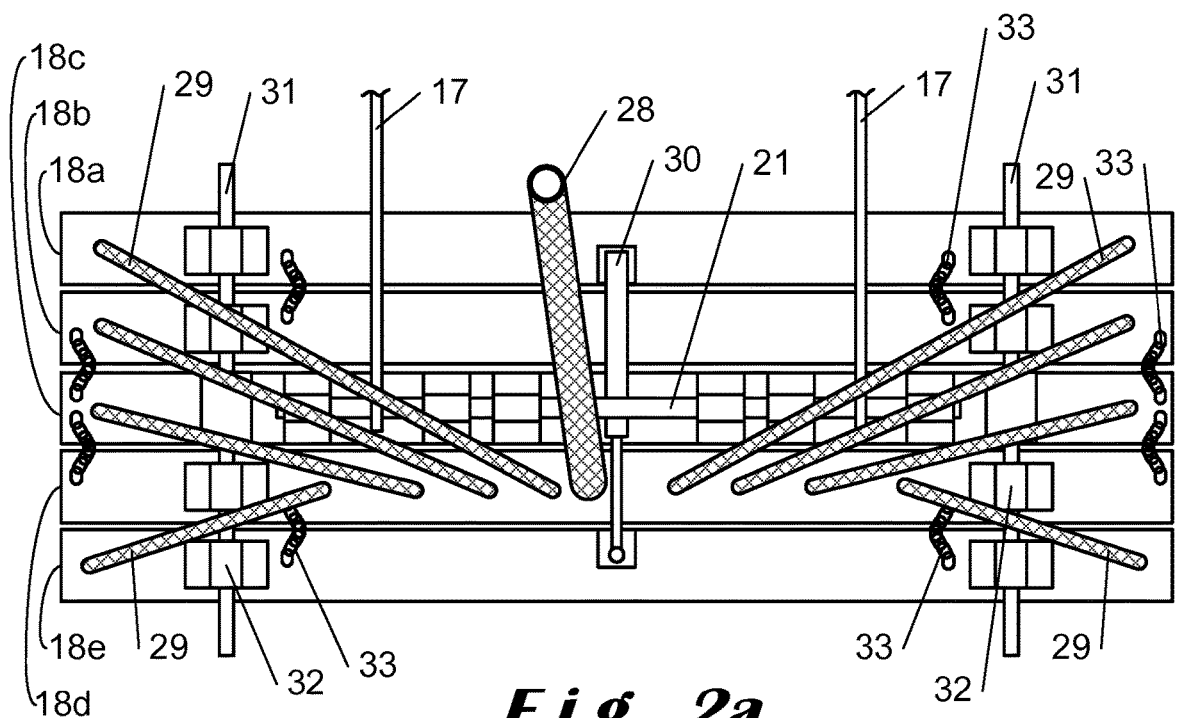
FIGS. 2a and 2b show a top view of the housing of the transfer mechanism of the transfer machine of FIG. 1.
Figure 2B:
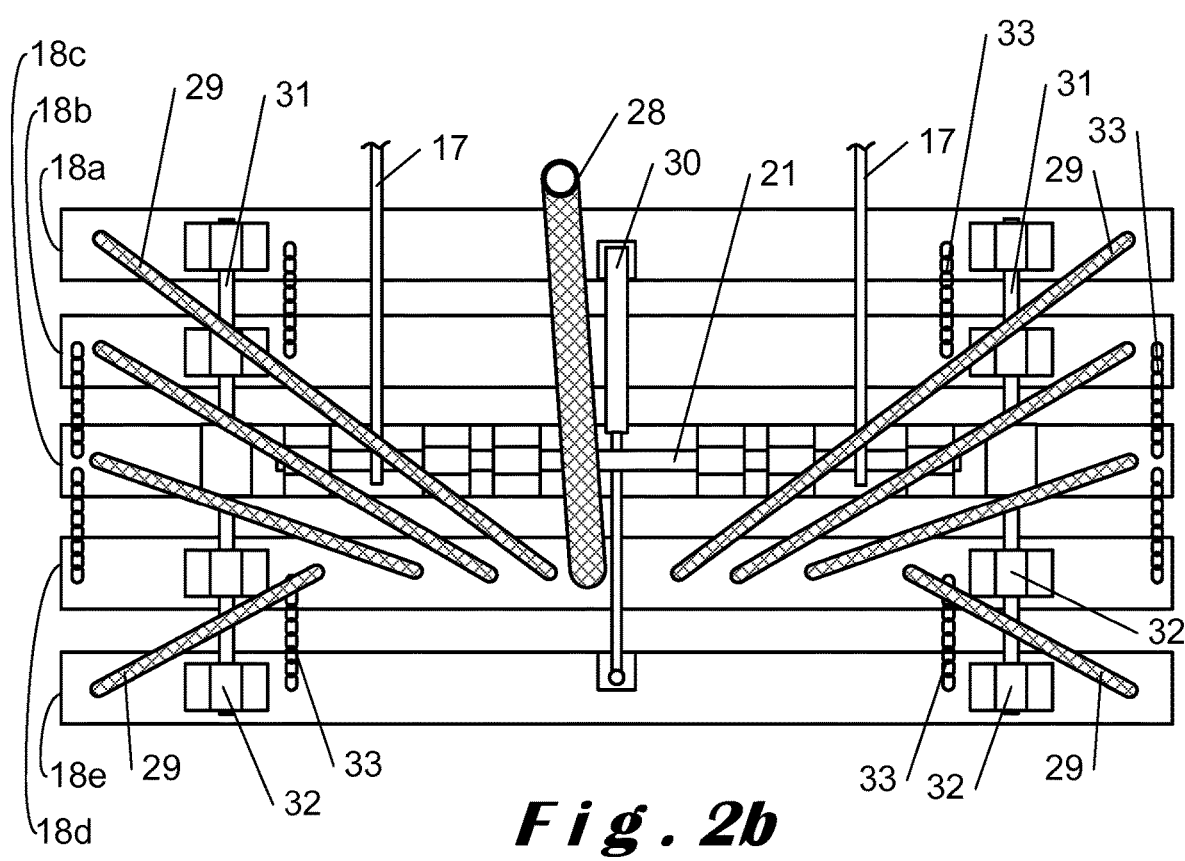

FIGS. 2a and 2b show details of the housing 18 on which the egg pickup means 19 are provided. Specifically, the housing 18 consists of five separate boxes 18a, 18b, 18c, 18d, 18e which are interconnected with two coupling rods 31 and one coupling piece 32 per coupling rod 31 per box 18a, 18b, 18c, 18d, 18e. Two rows with egg pickup means 19 are provided on each of these boxes 18a, 18b, 18c, 18d, 18e, as shown in FIG. 1. The box 18c is fixedly attached to the support elements 17 in the rails 16 on the upright wall 15. Owing to the coupling rods 31 and the coupling pieces 32, the boxes 18a, 18b, 18d, 18e undergo the same vertical displacement as the box 18c. It is clear that a different number of coupling rods 31, for example only one, can be used to couple the boxes 18a, 18b, 18c, 18d, 18e together.

The vacuum pump 25 is connected to the box 18d via a main hose 28 and from the box 18d two distribution tubes 29 go to each other box 18a, 18b, 18c, 18e. In other words, each box 18a, 18b, 18c, 18d, 18e acts as a vacuum reservoir with the vacuum pump working only directly on one of the boxes 18a, 18b, 18c, 18d, 18e. If desired, it is also possible to have only one distribution hose 29 to each box 18a, 18b, 18c, 18e, but this lowers the speed at which the eggs can be gripped by the egg pickup means 19. Likewise, more than two distribution hoses 29 can be provided to each box 18a, 18b, 18c, 18e so that the necessary negative pressure for gripping the eggs is reached more quickly.

As shown in FIGS. 2a and 2b, the boxes 18a, 18b, 18c, 18d, 18e have two different positions among themselves. In FIG. 2a, the boxes 18a, 18b, 18c, 18d, 18e are in their closed position, the distance between the boxes 18a, 18b, 18c, 18d, 18e being chosen such that the distance between the egg pickup means 19 corresponds to the distance between the eggs in the setter trays 2; i.e. the size of the setter trays 2 determines the positioning of the egg pickup means 19 and the boxes 18a, 18b, 18c, 18d, 18e.

In FIG. 2b, the boxes 18a, 18b, 18c, 18d, 18e are pushed apart, whereby each pair of rows of egg pickup means 19 are separated a certain distance from each other. In other words, if the eggs are gripped by the egg pickup means 19, it is possible to move them apart from each other in pairs. In this way, it is specifically possible to position the eggs at a greater distance from each other on the covering material 3 such that the temperature increase of the eggs can be better controlled towards hatching time.

To move the boxes 18a, 18b, 18c, 18d, 18e apart from each other, a piston mechanism 30 is provided which is driven by an actuator 26 mounted on the upstanding wall 15 as shown in FIG. 1. This piston mechanism 30 is attached to both box 18a and box 18e and slides them away from each other or towards each other. At the end of the coupling rod 31 there is then a stop which determines the maximum distance between boxes 18a, 18e. Preferably, this stop is adjustable, which can easily be obtained by carrying out the stop as a pin which can be placed in a plurality of holes in the coupling rod 31. A chain 33 is provided between each two adjacent boxes 18a, 18b, 18c, 18d, 18e. These chains 33 ensure that the boxes 18b, 18c, 18d slide apart when the boxes 18a, 18e are displaced relative to each other. In addition, these chains 33 also determine the maximally extended position of the housing 18. In other words, by replacing these chains 33 with longer or shorter chains, the mutual maximum distance between the boxes 18a, 18b, 18c, 18d, 18e can also be controlled.

It will be appreciated that the housing 18 should not consist of different parts movable relative to each other, but that an integral housing 18 can also be used for laying the eggs in the poultry house, the integral housing 18 then forming a single vacuum reservoir for the egg pickup means 19.

As shown in FIG. 1, the transfer machine 1 is provided with a portable electric generator 27 mounted on the frame 4 and provided for supplying power to the different actuators 9, 11, 20, 25, 26. Such an electric generator 27 overcomes the disadvantages associated with a battery-powered power supply which is of course finite. It is also not necessary to provide a connection to an external power network, in which case cables would need to be provided through the poultry house.

In an advantageous embodiment, the electric generator 27 is detachable from the frame 4. In this way, the electric 27 can be cleaned separately, allowing easy maintenance and thus reducing the risk of contamination.

Furthermore, the transfer machine 1 is also provided with a control mechanism (not shown) for controlling the operation of the various components, such as the actuators 9, 11, 20, 25, 26. It is clear that one or more of the actuators 9, 11, 20, 25, 26 can also be combined in one or more joint actuators.

In the embodiment shown, an operator of the transfer machine 1 starts by placing one setter tray 2 filled with eggs on the carrying mechanism 7. The transport mechanism, i.e. the belts 12 with the actuator 11, move the placed setter tray 2 so that the operator can place a second setter tray 2 next to the already placed setter tray 2 on the carrying mechanism 7. Once both setter trays 2 have been placed, the transport mechanism will move the setter trays 2 to a predetermined lateral position, the eggs and the egg pickup means 19 being on the same lateral line relative to one another. Thereafter, the entire carrying mechanism 7 shifts forward to below the transfer mechanism 14, in particular to a predetermined forward position where the eggs and the egg pickup means 19 are on the same forward line relative to one another. The housing 18 with the egg pickup means 19 is then lowered until the egg pickup means 19 touch the eggs in the setter trays 2 whereupon the eggs are gripped, as described in more detail below as per FIGS. 3a to 3d. The housing 18 with the egg pickup means 19 is then moved upwards so that the eggs are lifted out of the setter trays 2, but preferably this lifting of the eggs takes place by gripping them so that the housing 18 does not have to be raised in its entirety. The whole carrying mechanism 7 can now be shifted backwards, so that the path is free for the housing 18 to be shifted down with the egg pickup means 19 and the eggs until the eggs are located near the floor, in particular near the covering 3 on the floor of the poultry house. The eggs are then released as described in more detail below as per FIGS. 3a to 3d. When placing the eggs on the covering material 3 the transfer machine 1 is preferably stopped, so as to be able to place the eggs on the covering material 3 as carefully as possible. Thereafter, the housing 18 is moved up again. Preferably, the empty setter trays 2 are also removed from the carrying mechanism 7, which can be done manually or by the transport system. During all this, the setter trays 2 therefore do not come into contact with the poultry house or with the litter placed therein so that there is no risk of contamination of the setter trays.

Figure 3A:
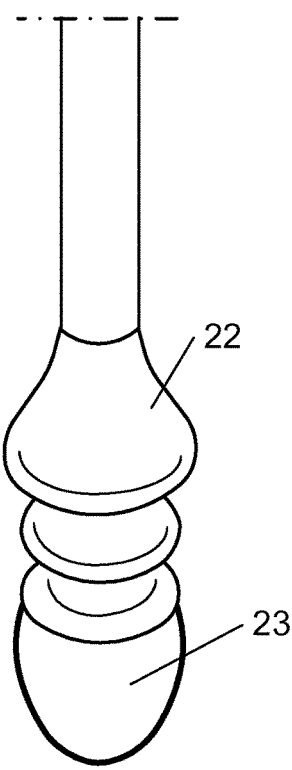
FIGS. 3a to 3d show a perspective view of the gripping of one egg and the positioning of this egg on the litter by an egg pickup means of the transfer mechanism of the transfer machine of FIG. 1.
Figure 3B:
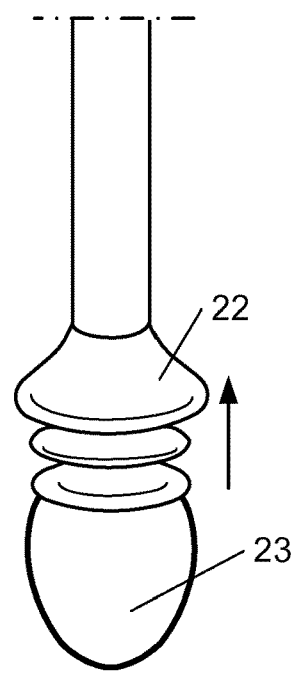

FIGS. 3a and 3 show details about the egg pickup means 19 and the operation thereof, i.e. the gripping of the eggs from the setter tray 2 and the positioning of the eggs in the covering 3. Concretely, these are carried out as suction cups 22 in which the top of one egg fits as shown in FIG. 3a. In practice, such egg pickup means 19 are already used in the stationary transfer machines used in hatcheries to transfer set eggs from setter trays 2 into hatching trays. An example of this is the 'Petersime Transferring Machine', which has 150 suction cups, allowing it to transfer 150 eggs from a single setter tray to a hatching tray in one go.

When the suction cups 22 come into contact with their respective egg 23, the vacuum pump 25 is activated which sucks air away from the space inside the suction cups 22. As a result, the eggs are suctioned as indicated by the black arrow in FIG. 3b. On this figure it can also be seen that, by suctioning the eggs, the suction cups 22 are compressed, which ensures that the eggs are partially lifted out of the setter trays 2. It will be apparent to a person skilled in the art that, in a non-shown embodiment, the eggs can even be completely lifted out of their setter tray 2 by the suction effect of the suction cups, which results in a time saving.

Figure 3C:
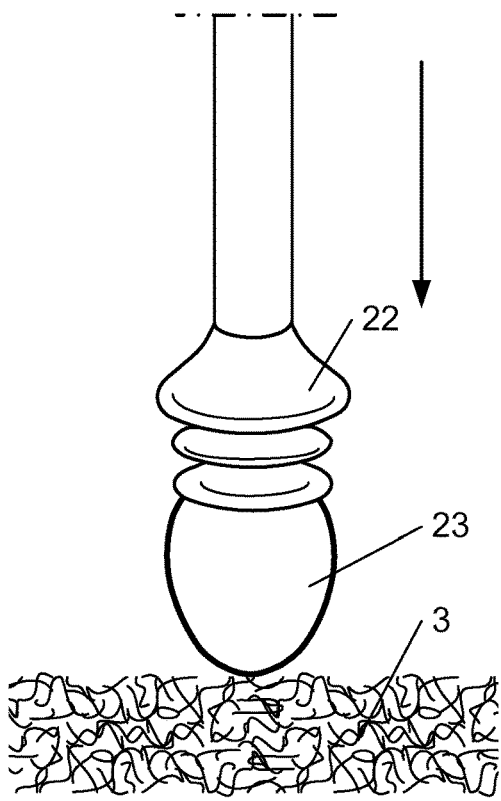
Figure 3D:
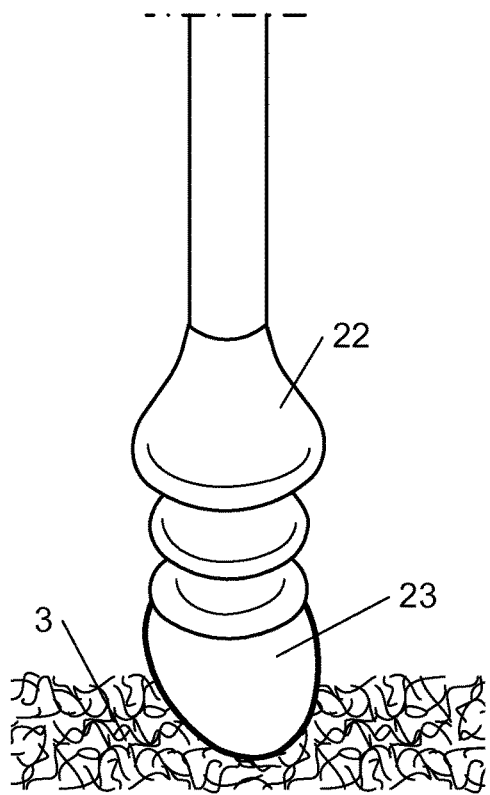

By lowering the entire housing 18, as described above, the eggs are moved to just above the covering 3 as shown in FIG. 3c, the lowering being indicated by the black arrow. By switching off the vacuum pump 25, air is again introduced into the suction cup 22, as a result of which the suction cup expands back to its original shape. As a result, the egg is partially pushed into the covering 3 as shown in FIG. 3d. This is advantageous for insulating the eggs. This is also achieved automatically, without the need for introducing such cavities in advance.

In an advantageous embodiment, it is also possible that the vacuum pump 25 can blow air towards the housing 18 and thus towards the suction cups 22. In other words, the vacuum pump is reversible and can both blow air and aspirate air. In this way it is possible, during the positioning of the eggs in the covering 3, to let the vacuum pump blow air. First of all, this will ensure that the suction cups 22 release the eggs more quickly, so that the overall operation of the transfer machine 1 is accelerated. In addition, this air flow will also contribute to pushing the eggs 3 into the covering. If desired, only the air flow can also be used for pushing the eggs into the covering 3.

Alternatively, it is possible to only position the eggs on the covering 3 without pushing them into it. This can be particularly advantageous if the covering material 3 includes a roll of foam which is unrolled on the floor of the poultry house, which can already be provided with cavities for the eggs in advance. In this way the eggs are adequately insulated and need not be pushed into the covering 3.

It will be appreciated that the suction cups 22 can also be replaced by mechanical grippers as described in EP 3 044 097. Here, if desired, the mechanical grippers can also position the eggs in the covering 3, by pushing the eggs into the covering 3 while they are still gripped, and only then releasing them. However, suction cups are preferred over mechanical grippers because they involve the smallest risk of damaging the eggs.

Figure 4:
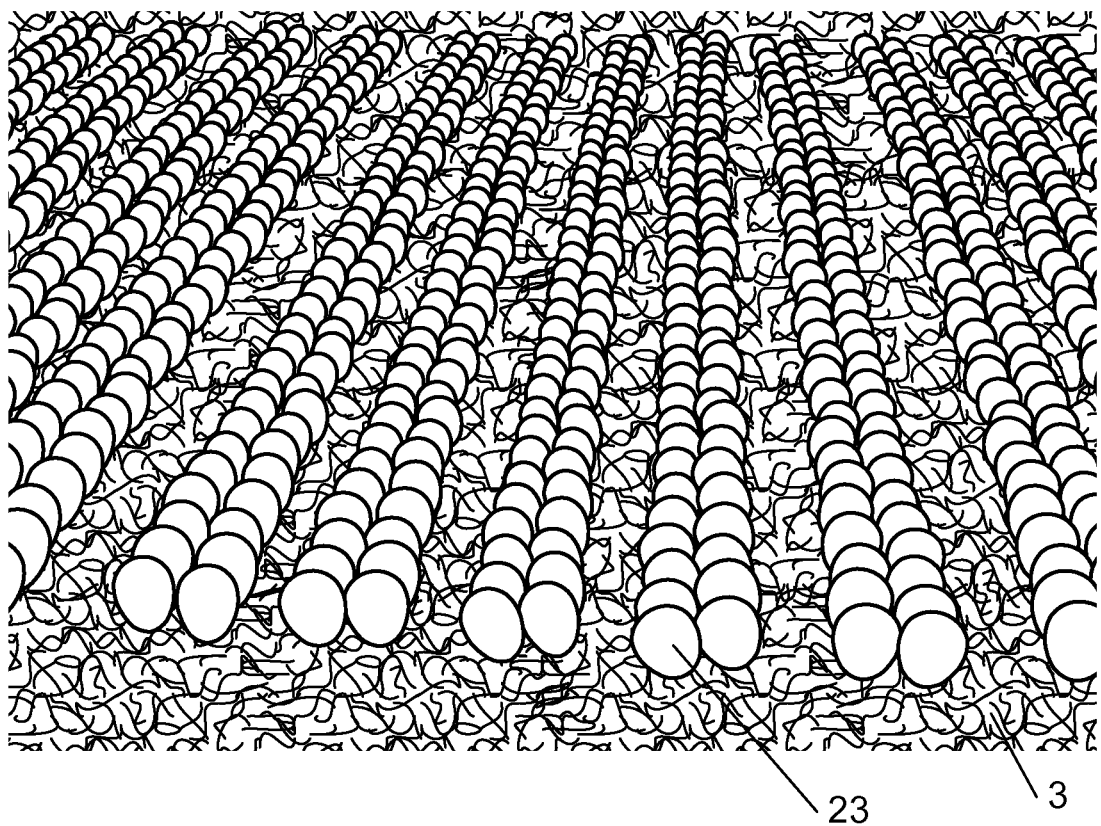
FIG. 4 schematically represents a perspective view of a part of the litter layer with eggs on it having been laid down with the transfer machine of FIG. 1.

FIG. 4 shows the final result of transferring the eggs 23 from the setter trays 2 to the covering 3 on the floor of the poultry house. As can be seen, the eggs 23 are positioned per pair of rows with some more open space between the pairs of rows, this being the result of moving different parts of the housing 18 away from each other as described above. In this way, it is specifically possible to position the eggs at a greater distance from each other on the covering material 3 such that the temperature increase of the eggs can be better controlled towards hatching time.

The above-described transfer machine 1 allows the eggs to be placed in any place in the poultry house. In order to reduce the heating costs, it is preferable to measure where it is the hottest in the poultry house in advance. This may depend on the heating system but also the wind direction. Based on the measured temperatures, it can then be determined where the eggs will be laid, namely at the place where the temperature is as optimal as possible for the eggs to be hatched. Usually this will be in the hottest place in the poultry house, unless cooling in the poultry house is required, which, however, would be very exceptional.

Although aspects of the present invention have been described with respect to particular embodiments, it will be apparent to those skilled in the art that these aspects may also be practised in other forms.

The invention claimed is:

1. A transfer machine for placing eggs in a poultry house on a floor thereof, said eggs being located in setter trays in which they were set, said transfer machine comprising:
   a frame that can be rolled through the poultry house;
   a carrying mechanism mounted on the frame and configured to carry at least one of said setter trays with set eggs; and
   a transfer mechanism attached to the frame, having a series of egg pickup means each configured for gripping one of the set eggs, the transfer mechanism being configured for lifting the set eggs out of said setter trays and for placing the set eggs on said floor,
   wherein the transfer mechanism is movably mounted on the frame up and down along only a predetermined vertical path between an upper position and a lower position and wherein the carrying mechanism is movably mounted on the frame between an outer position, in which the carrying mechanism is outside the path of the transfer mechanism, and an inner position, in which the carrying mechanism is located in the path of the transfer mechanism, the transfer machine further comprising:
   a first actuator configured for moving the transfer mechanism up and down;
   a second actuator configured for moving the carrying mechanism back and forth;
   a third actuator configured for actuating the egg pickup means; and
   a control mechanism configured to:
      a) control said second actuator for moving the carrying mechanism from its outer position to its inner position;
      b) control said first actuator for moving the transfer mechanism down to the set eggs located in said setter trays on the carrying mechanism;
      c) control said third actuator for gripping the set eggs with the egg pickup means;
      d) control said second actuator for moving the carrying mechanism from its inner position to its outer position;
      e) control said first actuator for moving the transfer mechanism downwards, towards the floor, along the path;
      f) control said third actuator for releasing the set eggs from the egg pickup means to place them on the floor; and
      g) control said first actuator for moving the transfer mechanism up to its upper position.

2. The transfer machine according to claim 1, wherein the transfer mechanism comprises at least two carrying elements which can be moved towards and away from each other and a fourth actuator, configured for moving said at least two carrying elements towards and away from each other, where a number of the series of egg pickup means are applied on each of the carrying elements, and wherein the control mechanism is further configured to:
   control said fourth actuator for moving said carrying elements away from each other after said control of said second actuator for moving the carrying mechanism from its inner position to its outer position and before said control of said third actuator for releasing the set eggs from the egg pickup means to place them on the floor; and
   control said fourth actuator for moving said carrying elements towards each other after said control of said third actuator for releasing the set eggs from the egg pickup means to place them on the floor.

3. The transfer machine according to claim 2, wherein said fourth actuator comprises a pneumatic piston mechanism, wherein at least one adjustable limiter is provided between said carrying elements for controlling and limiting a maximum distance between said carrying elements.

4. The transfer machine according to claim 1, wherein the predetermined path of the transfer mechanism defines a predetermined path of each of the egg pickup means of the series of egg pickup means,
   wherein the carrying mechanism comprises positioning means configured to position the setter tray so that each of the set eggs is on the predetermined path of one of the egg pickup means, the carrying mechanism comprising a fifth actuator configured for driving the positioning means, and
   wherein the control mechanism is further configured to control, before said control of said first actuator for moving the transfer mechanism down to the set eggs located in said setter trays on the carrying mechanism, said fifth actuator for positioning the setter tray in the path of the carrying mechanism so that each of the set eggs is on the predetermined path of one of the egg pickup means.

5. The transfer machine according to claim 4, wherein the positioning means comprise a transport mechanism configured for moving the setter tray in a substantially horizontal direction.

6. The transfer machine according to claim 4, wherein a direction of movement of the positioning means is substantially perpendicular to the back and forth direction of movement of the carrying mechanism.

7. The transfer machine according to claim 1, wherein the carrying mechanism is mounted in a back and forth movable manner on the frame in a substantially horizontal direction.

8. The transfer machine according to claim 1, wherein said setter trays have a substantially rectangular shape, wherein the carrying mechanism is provided for carrying at least two setter trays which are placed with their short sides substantially against each other.

9. The transfer machine according to claim 1, wherein each egg pickup means comprises a suction cup which is configured for, during said control of said first actuator for moving the transfer mechanism down to the set eggs located in said setter trays on the carrying mechanism, making contact with one of the set eggs, said third actuator being configured for sucking the air out of the suction cups for gripping the set eggs by suction.

10. The transfer machine according to claim 9, wherein the transfer mechanism comprises at least two carrying elements which can be moved towards and away from each other and a fourth actuator, configured for moving said at least two carrying elements towards and away from each other, where a number of the series of egg pickup means are applied on each of the carrying elements, and wherein each of said carrying elements is provided with a vacuum reservoir to which the egg pickup means of said carrying elements are connected, said third actuator being configured for sucking air from the vacuum reservoirs.

11. The transfer machine according to claim 9, wherein said suction cups are resilient so that, during said control of said third actuator for releasing the set eggs from the egg pickup means to place them on the floor, by a force generated by the resilient suction cups, each of the set eggs penetrates to a certain depth into a layer of covering material on the floor of the poultry house.

12. The transfer machine according to claim 9, wherein said third actuator is further configured to pump, during said control of said third actuator for releasing the set eggs from the egg pickup means to place them on the floor, air into each suction cup so that each of the set eggs penetrates to a certain depth into a layer of covering material on the floor of the poultry house.

13. The transfer machine according to claim 1, wherein one or more of the actuators is pneumatically driven.

14. The transfer machine according to claim 1, wherein the number of egg pickup means from said series corresponds to the number of eggs in one or in two of the setter trays, the transfer mechanism being configured to simultaneously lift each of the set eggs from each of the setter trays.

15. The transfer machine according to claim 1, wherein said series of egg pickup means include at least 30 pickup means.

16. The transfer machine according to claim 1, further comprising a motor configured for moving the frame through the poultry house.

17. The transfer machine according to claim 1, wherein the control mechanism is further configured to control said first actuator for upwardly moving the transfer mechanism to lift the set eggs gripped by the egg pickup means out of said setter trays after control of said third actuator for gripping the set eggs with the egg pickup means and before control of said second actuator for moving the carrying mechanism from its inner position to its outer position.

18. A transfer machine for placing eggs in a poultry house on a floor thereof, said eggs being located in setter trays in which they were set, said transfer machine comprising:
   a frame configured to be rolled through the poultry house;
   a carrying mechanism mounted on the frame and configured to carry at least one of said setter trays with set eggs; and
   a transfer mechanism attached to the frame, said transfer mechanism having a series of egg pickups each configured for gripping one of the set eggs, the transfer mechanism being configured for lifting the set eggs out of said setter trays and for placing the set eggs on said floor, wherein the transfer mechanism is movably mounted on the frame up and down along only a predetermined vertical path between an upper position and a lower position and wherein the carrying mechanism is movably mounted on the frame between an outer position, in which the carrying mechanism is outside the path of the transfer mechanism, and an inner position, in which the carrying mechanism is located in the path of the transfer mechanism,
   a first actuator configured for moving the transfer mechanism up and down;
   a second actuator configured for moving the carrying mechanism back and forth;
   a third actuator configured for actuating the egg pickups; and
   a controller configured to:
      a) cause said second actuator to move the carrying mechanism from its outer position to its inner position;
      b) cause said first actuator to move the transfer mechanism down to the set eggs located in said setter trays on the carrying mechanism;
      c) cause said third actuator to grip the set eggs with the egg pickups;
      d) cause said second actuator to move the carrying mechanism from its inner position to its outer position;
      e) cause said first actuator to move the transfer mechanism downwards, towards the floor, along the path;
      f) cause said third actuator to release the set eggs from the egg pickups to place the eggs on the floor; and
      g) cause said first actuator to move the transfer mechanism up to its upper position.

\* \* \* \* \*